United States Patent
Bogle et al.

(10) Patent No.: US 10,155,625 B1
(45) Date of Patent: Dec. 18, 2018

(54) CONVEYOR BELTS AND MODULES WITH TWIST-LOCK ACCESSORIES

(71) Applicant: Laitram, L.L.C., Harahan, LA (US)

(72) Inventors: David W. Bogle, Round Rock, TX (US); Terral A. Ridgell, Tickfaw, LA (US); Warren E. Cancienne, Jr., River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 156 days.

(21) Appl. No.: 14/841,907

(22) Filed: Sep. 1, 2015

(51) Int. Cl.
*B65G 17/10* (2006.01)
*B65G 17/30* (2006.01)
*B65G 17/46* (2006.01)

(52) U.S. Cl.
CPC .............. *B65G 17/10* (2013.01); *B65G 17/30* (2013.01); *B65G 17/46* (2013.01)

(58) Field of Classification Search
CPC ........ B65G 17/08; B65G 17/10; B65G 17/30; B65G 17/46
USPC ............................. 198/698, 699.1, 850–853
See application file for complete search history.

(56) References Cited

U.S. PATENT DOCUMENTS

| | | | |
|---|---|---|---|
| 4,556,142 A | 12/1985 | Lapeyre | |
| 4,993,544 A | 2/1991 | Bailey et al. | |
| 5,247,789 A * | 9/1993 | Abbestam | B65G 17/08 198/851 |
| 5,303,818 A | 4/1994 | Gruettner et al. | |
| 5,335,768 A | 8/1994 | Schladweiler | |
| 5,634,550 A | 6/1997 | Ensch et al. | |
| 5,899,322 A * | 5/1999 | Gamble, Jr. | B65G 17/08 198/853 |
| 5,960,937 A | 10/1999 | Stebnicki et al. | |
| 6,196,379 B1 | 3/2001 | Van Esch et al. | |
| 6,209,716 B1 | 4/2001 | Bogle et al. | |
| 6,213,292 B1 | 4/2001 | Takahashi et al. | |
| 6,216,854 B1 | 4/2001 | Damkjaer et al. | |
| 6,227,356 B1 | 5/2001 | Van Zijderveld et al. | |
| 6,662,938 B2 | 12/2003 | Damkjaer | |
| 6,695,128 B2 | 2/2004 | Palmaer et al. | |
| 6,766,901 B2 | 7/2004 | Guldenfels et al. | |
| 6,840,371 B2 | 1/2005 | Hansen et al. | |
| 6,926,134 B2 * | 8/2005 | Verdigets | B65G 17/08 198/698 |
| 6,997,306 B2 * | 2/2006 | Sofranec | B65G 17/08 198/779 |
| 7,081,001 B1 | 7/2006 | Conroy et al. | |
| 7,252,191 B2 | 8/2007 | Ozaki et al. | |
| 7,364,037 B2 | 4/2008 | Elsner | |
| 7,455,542 B2 | 11/2008 | Norwood et al. | |

(Continued)

OTHER PUBLICATIONS

International Search Report and Written Opinion of the International Searching Authority, PCT/US2016/045954, dated Dec. 5, 2016, Korean Intellectual Property Office.

*Primary Examiner* — Gene Crawford
*Assistant Examiner* — Keith R Campbell
(74) *Attorney, Agent, or Firm* — James T. Cronvich (57) ABSTRACT

A conveyor belt and belt modules with plug-in accessories, such as sideguards. The accessories have plugs that plug into sockets in the belt or individual belt modules. Lugs and mounting slots and tabs and detents on the plugs and sockets help guide, register, and lock the accessories in place. The plugs and sockets allow the accessories to be locked and unlocked by twisting the plugs in the sockets.

19 Claims, 5 Drawing Sheets

(56) References Cited

U.S. PATENT DOCUMENTS

| | | | |
|---|---|---|---|
| 7,494,006 B2 * | 2/2009 | Knott | B65G 17/08 |
| | | | 198/850 |
| 7,556,145 B2 | 7/2009 | Elsner | |
| 7,686,159 B2 | 3/2010 | Elsner | |
| 7,699,160 B2 | 4/2010 | Marsetti | |
| 8,371,436 B2 | 2/2013 | Cornelissen et al. | |
| 9,199,797 B2 * | 12/2015 | Menke | B65G 17/08 |
| 9,216,859 B2 * | 12/2015 | Visconti | B65G 15/30 |
| 9,334,121 B2 * | 5/2016 | Bogle | B65G 15/30 |
| 2002/0129481 A1 | 9/2002 | Palmaer et al. | |
| 2006/0039156 A1 | 2/2006 | Chen | |
| 2013/0233676 A1 | 9/2013 | Baek, IV et al. | |

\* cited by examiner

CONVEYOR BELTS AND MODULES WITH TWIST-LOCK ACCESSORIES

BACKGROUND

The invention relates generally to power-driven conveyors and more particularly to conveyor belts with detachable accessories.

For versatility, replaceability, or manufacturability, conveyor belts often include accessories that can be attached to and detached from the belts. Examples include sideguards, holddown tabs, flights, and roller assemblies. The accessories in modular conveyor belts are often retained by hinge rods used to interconnect the belt modules together at hinge joints. In that case installation or removal of the accessory requires partial disassembly of the belt.

SUMMARY

A conveyor belt module embodying features of the invention comprises a module body and an accessory. The module body has a first side and an opposite second side and a wall bounding a socket opening onto the first side. The accessory includes a plug that is sized to mate with the socket. The plug has an outer surface between a first end and a second end about an axis. An appendage extends outward from the first end of the plug. A guide mechanism is formed by first coacting structure on the plug and the wall to guide the plug into a locked, fully inserted position in the socket as the plug is rotated through a twist angle. A locking mechanism is formed by second coacting structure on the plug and the wall to lock the plug in the socket in the locked, fully inserted position.

In another aspect, a conveyor belt embodying features of the invention comprises a first side and an opposite second side defining the thickness of the conveyor belt and a plurality of sockets. Each socket is bounded by a wall that opens onto the first side of the conveyor belt. A lug extends from the cylindrical wall into the socket. A plurality of accessories, each including a plug having an outer surface between a first end and a second end are sized to mate with the sockets. An appendage extends outward from the first end of each accessory's plug. A guide mechanism associated with each of the accessories and sockets is formed by first coacting structure on the plug and the wall to guide the plug into a locked, fully inserted position in the socket as the plug is rotated through a twist angle. A locking mechanism associated with each of the accessories and sockets is formed by second coacting structure on the plug and the wall to lock the plug in the socket in the locked, fully inserted position.

DETAILED DESCRIPTION

Figure 1:
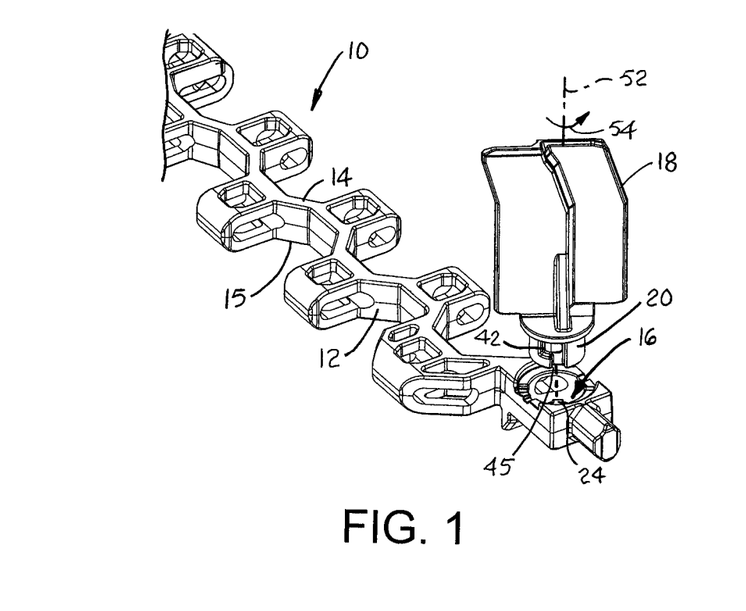
FIG. 1 is an exploded view of a portion of a conveyor belt module and a plug-in sideguard embodying features of the invention.

A portion of a conveyor belt module and accessory embodying features of the invention is shown in FIG. 1. The module 10 includes a module body 12 having a top side 14 and an opposite bottom side 15 across the body's thickness. A socket 16 in the module body 12 opens onto the top and bottom sides 14, 15 of the module body. An accessory 18, a sideguard in this example, has a plug 20 that is sized to mate with and plug into the socket 16 in the module body 12.

Figure 2:
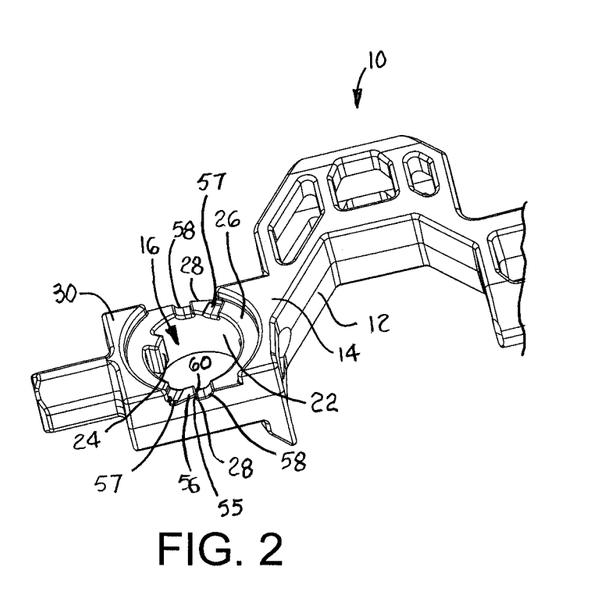
FIG. 2 is an enlarged view of the side edge of the conveyor belt module of FIG. 1.

The socket 16, shown in more detail in FIG. 2, is bounded by a wall 22—shown in this version as a circular cylindrical wall. But the wall could have another shape, such as polygonal, for example. A lug 24 extends radially outward from the wall 22 into the socket 16. In this example, the socket 16 has a rim 26 recessed slightly below the top side 14 of the module body 12. The rim 26 forms a ledge in which two detents 28 are formed diametrically opposite each other across the socket 16. In this example, the socket 16 is located at a side edge 30 of the module 10.

Figure 3A:
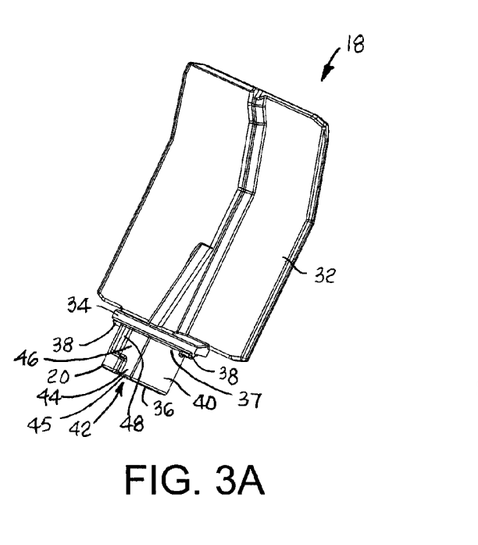
FIGS. 3A and 3B are axonometric views of the sideguard of FIG. 1 viewed from opposite sides.
Figure 3B:
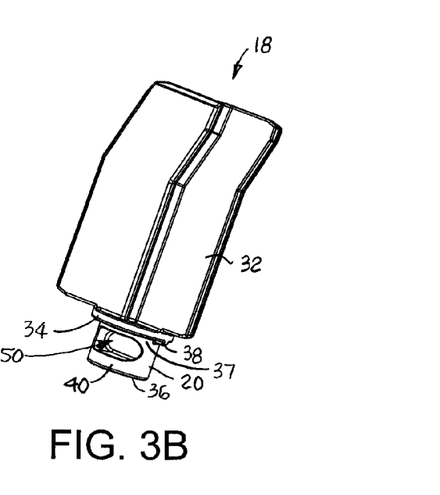

As shown in FIGS. 3A and 3B, the accessory 18 has a sideguard appendage 32 upstanding from a circular base 34. The plug 20 extends downward from the base 34 away from the appendage 32. The base 34 has a greater diameter than the cylindrical plug 20. The plug 20 has a flat bottom 36 at one end. Protrusions, such as tabs 38, extend radially outward from the plug 20 at its top end 37 and downward from the base 34. The tabs 38 interlock with the detents 28 (FIG. 2) in the module body 12 to lock the accessory 18 in place. Thus, plug structure—the tabs 38—and socket wall structure—the detents 28—coact to form a locking mechanism for locking the fully inserted plug 20 in the socket 16. The plug 20 has an outer surface 40—circular cylindrical in this version—to mate with the shape of the socket 16. A slot 42 is recessed into the outer surface 40. The slot 42 has an initial portion 44 that extends from an entrance 45 at the bottom 36 of the plug 20 toward the top 37. The initial portion 44 of the slot 42 opens into a wider terminal portion 46 that extends to a blind end 48 that is circumferentially offset from the entrance 45 to the slot 42. The two portions 44, 46 form a dogleg—in this example a 90° dogleg. A recess 50 in the outer surface 40 of the plug 20 opposite the slot 42 accommodates the end of a hinge rod connecting the belt module to an adjacent belt module.

The terms "top" and "bottom" as they relate to the plug and the belt module are not meant to be limited to a specific spatial orientation. They are used in reference to the orientations in the drawings to help explain features of the invention. As it relates to the plug 20, the term "top" means the side of the plug to which the appendage 32 is attached. The term "bottom" means the side opposite the "top." As it relates to the belt module, the term "top" means the normal article-conveying side of the module, and the term "bottom" means the opposite side.

Figure 4A:
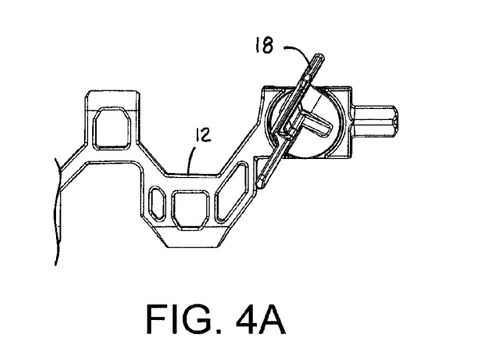
FIGS. 4A and 4B are top plan views of the side edge of the conveyor belt module of FIG. 1 showing the sideguard in unlocked and locked positions.
Figure 4B:
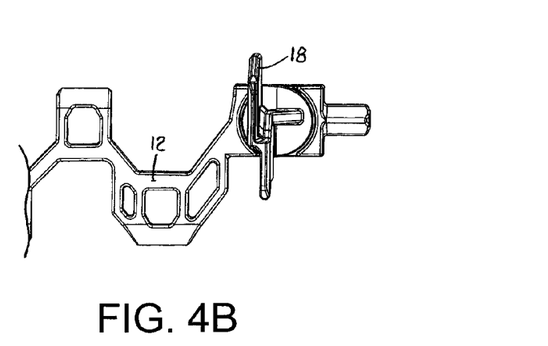

As shown in FIG. 1, the plug 20 and its mating socket 16 allow the accessory 18 to be rotated, or twisted, about a twist axis 52 perpendicular to the plane of the module 10 into a locked position. First, the lug 24 is aligned vertically with the entrance 45 of the slot 42. Next, the plug 20 is inserted into the socket 16. The lug 24 advances through the entrance 45 and the initial portion of the slot 42 until the lug is received in the wider terminal portion of the slot. When the plug 20 is fully inserted, the tabs 38 (FIG. 3A) are received in a first depression 57 in the detents 28 (FIG. 2). This position is an unlocked position of the plug 20. Then the accessory 18 is rotated as indicated by the arrow 54 until the lug 24 is at the blind end of the terminal portion of the slot 42. Plug structure—the lug 24—and socket wall structure—the slot 42—coact to form a guide mechanism for guiding the plug 20 during insertion into and extraction from the socket 16. As the plug 20 is rotated, its tabs 38 ride up ramp faces 56 (FIG. 2) of the detents 28 toward bumps 55. The slot and detents help guide the lug and tabs. When the lug 24 reaches the end of the slot 42, the tabs 38 drop off the bumps 55 into second depressions 58 (FIG. 2) locking the plug 20 in place in the module body 12. With the slot 42 and detents 28 dimensioned as shown in FIGS. 1 and 2, the accessory 18 has to be twisted through a twist angle of about 30° in the module body 12 from its unlocked position in FIG. 4A to its fully inserted, locked position in FIG. 4B.

Figure 5A:
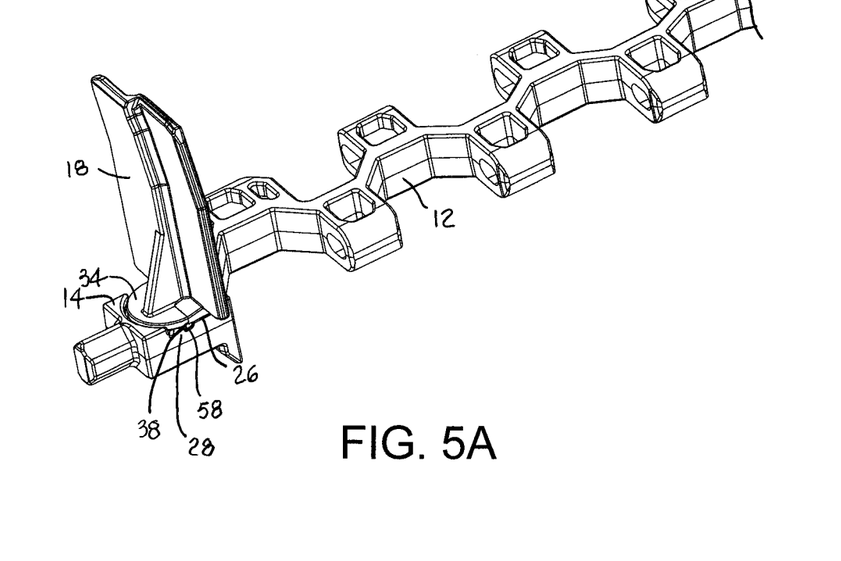
FIGS. 5A and 5B are axonometric views of the conveyor belt module of FIG. 1 looking obliquely down and up at the module.
Figure 5B:
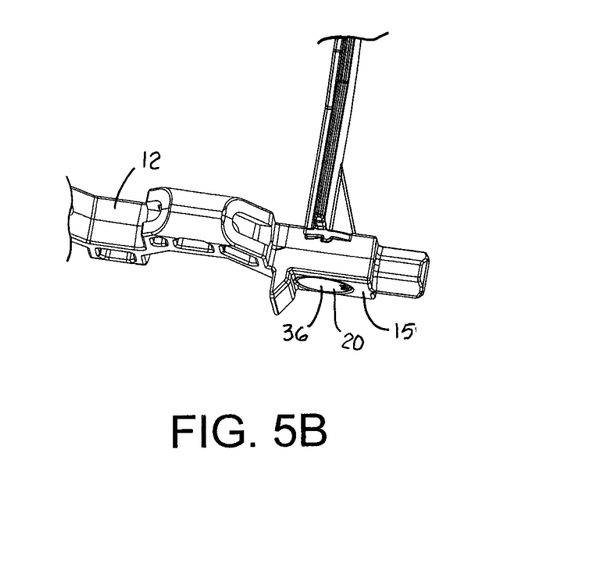

As shown in FIG. 5A, the base 34 sits on the recessed rim 26 when the accessory 18 is in its locked position. The base 34 is flush with the top side 14 of the module body 12. FIG. 5A also shows one of the tabs 38 in the locking depression 58 of the detent 28. When the accessory is locked, the relative positions of the slots, lugs, tabs, and detents—geometry—ensure that the appendages are registered. As shown in FIG. 5B, the bottom 36 of the fully inserted and locked plug 20 is flush with the bottom side 15 of the module body 12. The accessory 18 is detached by twisting, or rotating, the plug 20 in the opposite direction from that shown by the arrow 54 in FIG. 1. The tabs 38 scale the steep blocking faces 60 (FIG. 2) of the bumps 55 onto the tops of the ramp faces 56 to unlock the accessory 18. As the twisting continues, the tabs 38 move to the first detent depressions 57. When the tabs 38 are in the first depressions 57, the lug 24 is aligned with the entrance 45 to the slot 42 in the unlocked position. The plug 20 can then be withdrawn from the socket 16.

Figure 6:
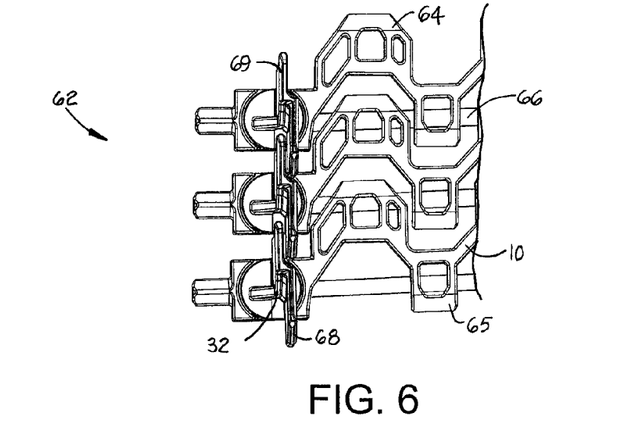
FIG. 6 is a top plan view of a portion of a conveyor belt constructed of belt modules as in FIG. 1.

FIG. 6 shows a section of a conveyor belt 62 constructed of belt modules 10 as in FIG. 1. The belt modules 10 have hinge eyes 64, 65 along opposite ends. Hinge rods 66 extending through aligned openings in the hinge eyes 64 interconnect the modules 10 together to form the conveyor belt 62. The locked sideguard appendages 32 have two laterally offset panels 68, 69, which allow the sideguards of adjacent modules to overlap without interference.

Figure 7A:
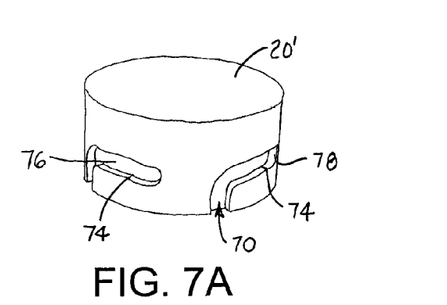
FIG. 7A is an axonometric view of another version of the plug portion of an accessory, such as a sideguard.
Figure 7B:
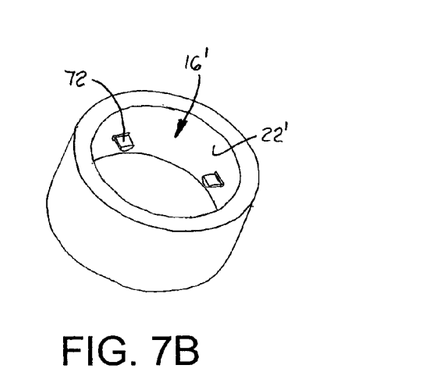
FIG. 7B is an axonometric view of the mating socket portion of the conveyor belt module.

FIGS. 7A and 7B show a slightly different version of a plug 20' and a socket 16'. In this version the plug 20' has four slots 70 to accommodate four lugs 72 protruding radially outward from the cylindrical wall 22' of the socket 16'. And the dogleg slots 70 have detents 74 along their terminal portions 76 to lock the lugs 72 at the ends 78 of the terminal slot portions. In this version the plug's slots 70 and the wall's lugs 72 constitute both an insertion-extraction guide mechanism for the plug 20' and a locking mechanism for locking the fully inserted plug in the socket 16'. Additional tabs and detents as in FIG. 5A are optional.

Figure 8A:
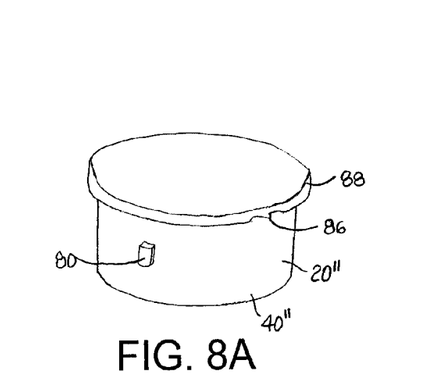
FIG. 8A is an axonometric view of yet another version of the plug portion of an accessory.
Figure 8B:
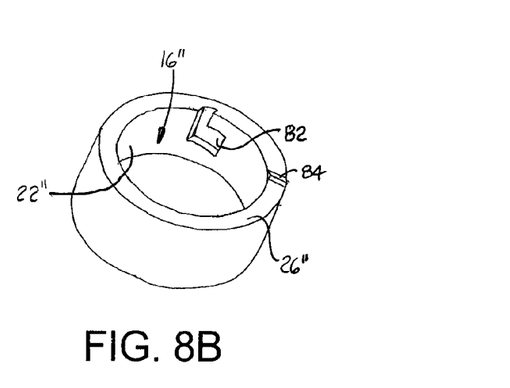
FIG. 8B is an axonometric view of the mating socket portion of the conveyor belt module.

FIGS. 8A and 8B show yet another socket-plug configuration. In this version the plug 20" has a lug 80 protruding radially outward from the plug's outer surface 40". The socket 16" has a dogleg slot 82 in its cylindrical wall 22" sized to receive the lug 80. Plug structure—the lug 80—and socket wall structure—the slot 82—coact to form a guide mechanism for inserting and extracting the plug 20". The rim 26" of the socket 16" has at least one tab 84 that engages at least one detent 86 at the top of the plug 20" on the underside of the base 88 on which an accessory appendage (not shown) is mounted. Socket rim structure—the tab 84—and plug structure—the detent 86—coact to form a locking mechanism for locking the fully inserted plug 20" in the socket 16". As in the other versions, the lug 80, slot 82, tab 84, and detent 86 are positioned so that the detent 86 locks the plug 20" in place when the lug 80 is at the terminal end of the slot 82.

Figure 9A:
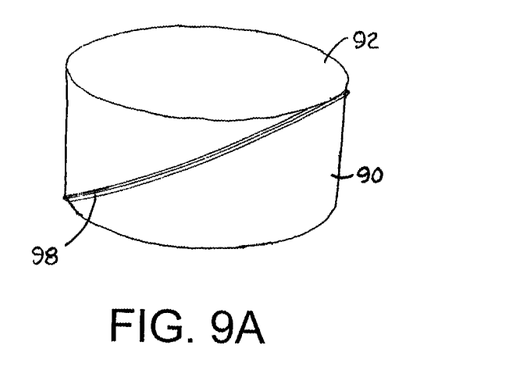
FIG. 9A is an axonometric view of a threaded version of the plug portion of an accessory.
Figure 9B:
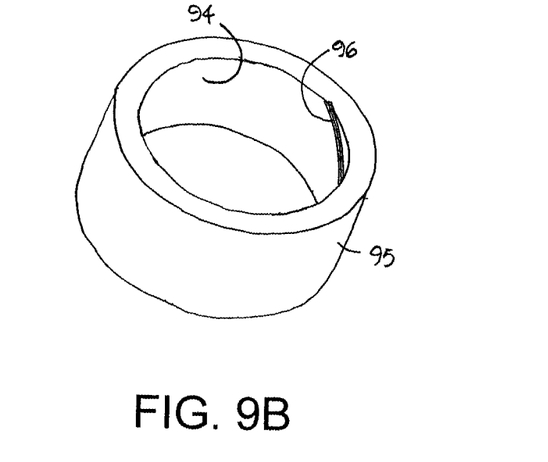
FIG. 9B is an axonometric view of the mating threaded socket portion of the conveyor belt module.

FIGS. 9A and 9B shows a threaded socket-plug configuration in which both the outer surface 90 of the plug 92 and the wall 94 of the socket 95 are threaded. In this example the wall 94 has an internal thread 96 with a root forming a helical recessed track in the wall, and the outer surface 90 of the plug 92 has an external thread 98 with the thread crest forming a helical protrusion to be received in the socket thread 96. Together the two engaged threads 96, 98 form a guide mechanism guiding the plug 92 during insertion into and extraction from the socket 95. Only one pair of mating threads is shown, but there could be more than one. Like the lug-and-slot versions, the screw-in threaded plug 92 is twisted into place in the socket 95. Although not shown, the plug 92 and the socket 95 could include coacting structure forming a locking mechanism, such as a detent, to lock the fully inserted plug in place. As an alternative, the socket could have an external thread engaging an internally threaded plug. In this version the plug 92 is rotated about 180° for full insertion or extraction. In all the example versions shown, the plugs had to be rotated, or twisted, about their twist axes a twist angle of 180° or less for full insertion. The twist angle is determined by the circumferential extent of the recessed track—internal thread root or slot—in the socket wall or in the outer surface of the plug. But the tread pitches could be decreased to provide more wraps around the socket wall and the plug. In that case, the twist angle would exceed 180°, but the attachment would be more secure. Although the invention has been described in detail in reference to a few versions, other versions are possible. For example, the slot and detent could both be formed on the plug or on the module body. As another example, appendages other than sideguards—holddowns, flights, lane dividers, high-friction inserts, hooks, guides, to name a few—could be attached to the plugs. It is also possible to make the socket so that the plug is inserted from the bottom side of the belt rather than from the top side. And the plugs could have both lugs and slots to mate with slots and lugs in the sockets. So, as these few examples suggest, the claims are not meant to be limited to the exemplary versions described in detail.

What is claimed is:

1. A conveyor belt module comprising:
  a module body including:
    a first side and an opposite second side;
    a wall bounding a socket opening onto the first side;
  an accessory including:
    a plug sized to mate with the socket, the plug having an outer surface between a first end and a second end about an axis;
    an appendage attached to and extending outward from the first end of the plug;

a guide mechanism formed by first coacting structure on the plug and the wall to guide the plug rotatively into a locked, fully inserted position in the socket as the plug is rotated through a twist angle;

a locking mechanism formed by second coacting structure on the plug and the wall to lock the plug in the socket in the locked, fully inserted position.

2. A conveyor belt module as in claim 1 wherein the first coacting structure of the guiding mechanism comprises:
   (a1) a recessed track formed in the outer surface of the plug and extending around the outer surface toward the first end of the plug from an entrance at the second end, and
   (b1) a protrusion extending radially inward from the wall of the module body into the socket; or
   (a2) a recessed track formed in the wall of the module body and extending around the wall toward the second side of the module body from an entrance at the first side, and
   (b2) a protrusion extending radially outward from the outer surface of the plug.

3. A conveyor belt module as in claim 1 wherein the first coacting structure of the guiding mechanism comprises:
   (a1) a lug extending radially inward from the wall of the module body into the socket, and
   (b1) a dogleg slot formed in the outer surface of the plug and having an initial portion extending toward the first end of the plug from an entrance at the second end to a terminal portion extending to a blind end circumferentially offset from the entrance; or
   (a2) a lug extending radially outward from the outer surface of the plug, and
   (b2) a dogleg slot formed in the wall of the module body and having an initial portion extending toward the second side of the module body from an entrance at the first side to a terminal portion extending to an end circumferentially offset from the entrance;
   wherein the plug is inserted into the socket by aligning the entrance to the initial portion of the slot with the lug, pushing the plug deeper into the socket with the lug received in the initial portion until the lug is received in the terminal portion of the slot, and rotating the plug about the axis through the twist angle so that the lug is at the blind end of the terminal portion of the slot in the locked, fully inserted position.

4. A conveyor belt module as in claim 1 wherein the second coacting structure of the locking mechanism comprises a tab extending radially outward from the outer surface at the first end of the plug and a rim around the socket at its opening onto the first side and a detent on the rim engaging with the tab when the plug is fully inserted in the socket to provide two positions for the tab: the locked, fully inserted position and an unlocked position with the lug aligned with the entrance to the slot so that the accessory can be removed from the module body.

5. A conveyor belt module as in claim 4 wherein the detent includes first and second depressions in the rim separated by a bump having a ramp face extending from the first depression and a steep face extending from the ramp face to the second depression.

6. A conveyor belt module as in claim 1 wherein the module body further includes a rim around the socket at its opening onto the first side and wherein the second coacting structure of the locking mechanism comprises a tab extending upward from the rim and a detent at the top of the plug engaging with the tab when the plug is fully inserted in the socket to provide two positions for the tab: the locked, fully inserted position and an unlocked position with the lug aligned with the entrance to the slot so that the accessory can be removed from the module body.

7. A conveyor belt module as in claim 6 wherein the detent includes first and second depressions in the rim separated by a bump having a ramp face extending from the first depression and a steep face extending from the ramp face to the second depression.

8. A conveyor belt module as in claim 3 wherein the accessory further includes a detent on the terminal portion of the slot to lock the lug against the end of the terminal portion.

9. A conveyor belt module as in claim 3 further comprising a plurality of the lugs and a plurality of the dogleg slots.

10. A conveyor belt module as in claim 1 wherein the module body further includes a rim around the socket at its opening onto the first side and wherein the accessory further includes a base at the top of the plug, wherein the base sits on the rim when the plug is in the locked, fully inserted in the socket.

11. A conveyor belt module as in claim 2 wherein the recessed track comprises a helical internal thread and the protrusion comprises the crest of a helical external thread.

12. A conveyor belt module as in claim 1 wherein the socket opens onto the second side and the second end of the plug is flush with the second side when the plug is in the locked, fully inserted position in the socket.

13. A conveyor belt module as in claim 1 wherein the socket is located at a side edge of the module body.

14. A conveyor belt module as in claim 1 wherein the module body extends in a direction of belt travel from a first end to a second and includes hinge eyes along the first end to accommodate a hinge rod and wherein the accessory further includes a recess formed in the outer surface of the plug, wherein the recess is aligned with the hinge eyes to receive the end of a hinge rod when the plug is in the locked, fully inserted position.

15. A conveyor belt module as in claim 1 wherein the outer surface of the plug and the wall bounding the socket define circular cylinders.

16. A conveyor belt module as in claim 1 wherein the appendage is a sideguard.

17. A conveyor belt comprising:
   a first side and an opposite second side defining the thickness of the conveyor belt;
   a plurality of sockets, each bounded by a wall opening onto the first side of the conveyor belt with a lug extending from the cylindrical wall into the socket;
   a plurality of accessories, each including a plug having an outer surface between a first end and a second end and sized to mate with the sockets and an appendage attached to and extending outward from the first end of the plug;
   a guide mechanism associated with each of the accessories and sockets and formed by first coacting structure on the plug and the wall to guide the plug rotatively into a locked, fully inserted position in the socket as the plug is rotated through a twist angle;
   a locking mechanism associated with each of the accessories and sockets and formed by second coacting structure on the plug and the wall to lock the plug in the socket in the locked, fully inserted position.

18. A conveyor belt as in claim 17 wherein the appendage is a sideguard.

19. A conveyor belt module comprising:
   a module body including:
      a first side and an opposite second side;

a wall bounding a socket opening onto the first side;
an accessory including:
- a plug sized to mate with the socket, the plug having an outer surface between a first end and a second end about an axis;
- an appendage extending outward from the first end of the plug;

a guide mechanism formed by first coacting structure on the plug and the wall to guide the plug into a locked, fully inserted position in the socket as the plug is rotated through a twist angle;

a locking mechanism formed by second coacting structure on the plug and the wall to lock the plug in the socket in the locked, fully inserted position;

wherein the module body extends in a direction of belt travel from a first end to a second and includes hinge eyes along the first end to accommodate a hinge rod and wherein the accessory further includes a recess formed in the outer surface of the plug, wherein the recess is aligned with the hinge eyes to receive the end of a hinge rod when the plug is in the locked, fully inserted position.

* * * * *